United States Patent
An

(10) Patent No.: US 10,112,277 B2
(45) Date of Patent: Oct. 30, 2018

(54) COMBINED TYPE ANGLE HEAD MILLING CUTTER FOR MACHINING MOUNTING FACES OF AXIAL BEARING

(71) Applicant: CITIC Dicastal CO., LTD., Qinhuangdao (CN)

(72) Inventor: Gang An, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 3 days.

(21) Appl. No.: 15/619,602

(22) Filed: Jun. 12, 2017

(65) Prior Publication Data
US 2017/0355050 A1 Dec. 14, 2017

(30) Foreign Application Priority Data
Jun. 12, 2016 (CN) .......................... 2016 1 0407303

(51) Int. Cl.
| | | |
|---|---|---|
| *B23Q 5/04* | (2006.01) | |
| *B23Q 5/20* | (2006.01) | |
| B23Q 11/08 | (2006.01) | |
| B23Q 1/54 | (2006.01) | |
| F02F 1/24 | (2006.01) | |

(52) U.S. Cl.
CPC ............... *B23Q 5/045* (2013.01); *B23Q 5/20* (2013.01); *B23Q 1/54* (2013.01); *B23Q 11/0883* (2013.01); *F02F 1/24* (2013.01)

(58) Field of Classification Search
CPC ............. B23Q 5/045; B23Q 5/20; B23Q 1/54
See application file for complete search history.

(56) References Cited

U.S. PATENT DOCUMENTS 4,084,482 A 4/1978 Derrien

FOREIGN PATENT DOCUMENTS

| CN | 102371382 A | 3/2012 |
|---|---|---|
| CN | 202861496 U | 4/2013 |
| CN | 203401126 U | 1/2014 |
| CN | 104785842 A | 7/2015 |
| EP | 0280776 A2 | 9/1988 |

*Primary Examiner* — Alan Snyder
(74) *Attorney, Agent, or Firm* — Syncoda LLC; Feng Ma; Junjie Feng

(57) ABSTRACT

A combined type angle head milling cutter is configured to machine mounting faces of an axial bearing. The combined type angle head milling cutter includes an angle head body, a lock nut, first slotted countersunk head screws, a first hexagon socket head cap screw, a first flat key, semicircle seal covers, first angular contact ball bearings, a cutter handle shaft lower adjusting pad, a cutter handle shaft, a cutter handle shaft upper adjusting pad, a bearing cover plate, a first bevel gear, a first spring washer, a second bevel gear, a bevel gear adjusting pad, an orientation shaft, cutter shaft inner-side seal covers, second hexagon socket head cap screws, a cutter shaft outer-side seal cover, a second slotted countersunk head screw, a small seal ring and the like.

2 Claims, 4 Drawing Sheets

COMBINED TYPE ANGLE HEAD MILLING CUTTER FOR MACHINING MOUNTING FACES OF AXIAL BEARING

CROSS-REFERENCE TO RELATED APPLICATIONS

This application claims priority to Chinese Patent Application No. 201610407303.4, filed on Jun. 12, 2016, the disclosure of which is incorporated by reference in its entirety.

BACKGROUND

During a machining process of an automobile cylinder head cover, an axial bearing serving as a workpiece machining actuator needs to be machined. In order to machine the bearing, eight faces need to be machined. In traditional techniques, this kind of end faces is machined by a three-edge milling cutter as shown in the FIG. 4, and the cutter needs to be very long and relatively thin in cutter bar; the eight faces need to be machined in sequence; as the cutter bar is long and thin, a cutting parameter is low, and thus the machining efficiency is low and the machining cost is high.

SUMMARY

The disclosure relates to the technical field of machining, and particularly designs a combined type angle head milling cutter for machining mounting faces of an axial bearing.

An object of the disclosure is to provide a combined type angle head milling cutter for machining mounting faces of an axial bearing. In order to accomplish the object of the disclosure, the inventor designs a combined type angle head milling cutter for machining eight mounting face of an axial bearing serving as a workpiece machining actuator.

In one aspect of the disclosure, a combined type angle head milling cutter for machining mounting faces of an axial bearing is provided. The combined type angle head milling cutter includes an angle head body (1), a lock nut (2), first slotted countersunk head screws (3), a first hexagon socket head cap screw (4), a first flat key (5), semicircle seal covers (6), first angular contact ball bearings (7), a cutter handle shaft lower adjusting pad (8), a cutter handle shaft (9), a cutter handle shaft upper adjusting pad (10), a bearing cover plate (11), a first bevel gear (12), a first spring washer (13), a second bevel gear (14), a bevel gear adjusting pad (15), an orientation shaft (16), cutter shaft inner-side seal covers (17), second hexagon socket head cap screws (18), a cutter shaft outer-side seal cover (19), a second slotted countersunk head screw (20), a small seal ring (21), a first shaft circlip (22), round nuts (23), flat washers (24), short cutter locating sleeves (25), long cutter locating sleeves (26), cutters (27), second flat key (28), cutter adjusting pads (29), a cutter shaft end cover (30), a big rubber seal flat pad (31), a cylindrical gear (32), a second spring washer (33), a third flat key (34), an M10 hexagon thin nut (35), a cylindrical transition gear (36), a second shaft circlip (37), a left transition gear adjusting pad (38), a transition shaft end cover (39), a small rubber seal flat pad (40), a cylindrical drive gear (41), an M8 hexagon thin nut (42), a bearing retaining ring (43), a second angular contact ball bearing (44), a drive shaft (45), a drive gear adjusting pad (46), a right transition gear adjusting pad (47), a third angular contact ball bearing (48), a transition shaft (49), a transition shaft seal cover (50), an O-shaped rubber seal ring (51), a gear adjusting pad (52), a cutter shaft (53), a big seal ring (54), deep groove ball bearings (55) and a rubber seal flat pad (56); characterized in that eight cutters (27) are installed on the cutter shaft (53), the cutters (27) are set in a way that the positions thereof are adjusted via the cutter adjusting pads (29), the short cutter locating sleeves (25) and the long cutter locating sleeves (26), and the flat washers (24) are placed on the outmost cutters (27) and fixed by the round nuts (23); two ends of the cutter shaft (53) are installed on the angle head body (1) by the deep groove ball bearings (55), and the cutter shaft inner-side seal covers (17) and the rubber seal flat pad (56) are installed on two sides of the interior of the angle head body (1) by the second hexagon socket head cap screws (18); the cutter shaft (53) inner-side seal covers not only are set to position the deep groove ball bearings (55), but also stop cutting fluid and dust from entering the interior of the angle head body via the big seal ring (54); the right side of the cutter shaft (53) is sealed by the cutter shaft outer-side seal cover (19), the rubber seal flat pad (56) and the small seal ring (21), the cylindrical gear (32) is installed on the left side of the cutter shaft (53), the position of the cylindrical gear (32) is adjusted via the gear adjusting pad (52), the second spring washer (33) is installed and fixed by the M10 hexagon thin nut (35), the cutter shaft end cover (30) and the big rubber seal flat pad (31) are installed on the outer side of the angle head body (11), and thus the cutter shaft (53) is sealed; the tail of the cutter handle shaft (9) meets the ISO7:24 standard, and used for being butted with the spindle of a machine tool; the cutter handle shaft (9) is installed on the angle head body (1) via the pair of first angular contact ball bearings (7), and the position of the cutter handle shaft (9) is adjusted via the cutter handle shaft upper adjusting pad (10); the first bevel gear (12) is installed at the end part of the cutter handle shaft, the position of the first bevel gear (12) is adjusted by the cutter handle shaft lower adjusting pad (8), and the first spring washer (13) and the lock nut (2) are used for fixing the first bevel gear (12) for preventing loosening; the outer rings of the first angular contact ball bearings and the angle head body are fixed by the bearing cover plate (11), and the cutter handle shaft is sealed by two semicircle seal covers (6); and the drive shaft (35) is connected to the angle head body (1) via the second angular contact ball bearing (44), and the position of the drive shaft (35) is fixed by a shaft shoulder and the bearing retaining ring (43). The second bevel gear (14) is installed on the right end of the drive shaft, and engaged with the first bevel gear (12) for transferring power, and the position of the second bevel gear is adjusted by the bevel gear adjusting pad (15). The cylindrical drive gear (41) is installed on the left end of the drive shaft, the position of the gear is adjusted by the drive gear adjusting pad (46), the gear is fixed by the M8 hexagon thin nut (42), and the spring washer is placed therebetween for preventing loosening; the transition shaft (49) is connected to the angle head body (1) via the third angular contact ball bearing (48), the cylindrical transition gear (36) installed on the transition shaft (49) is engaged with the cylindrical gear (32) and the cylindrical drive gear (41), the position of the cylindrical transition gear (36) is adjusted via the right transition gear adjusting pad (47), and the end part of the drive shaft is fixed by the second shaft circlip (37) for preventing the drive shaft from axially moving; the transition shaft end cover (39) and the small rubber seal flat pad (40) are installed on the outer side of the angle head body, the transition shaft seal cover (50) and the O-shaped rubber seal ring (51) are installed on the inner side of the angle head body, and the above four components are all used for sealing the transition shaft and preventing the entering of the cutting fluid.

In a preferred aspect of the disclosure, the tail of the cutter handle shaft (9) meets the ISO7:24 standard.

By using the combined type angle head milling cutter for machining the mounting faces of the axial bearing provided by the disclosure, machining of the eight mounting faces of the axial bearing can be completed at a time, so that the efficiency is greatly improved.

BRIEF DESCRIPTION OF THE DRAWINGS

Embodiments of the disclosure will be described in details below with reference to the accompanying drawings, in which.

LIST OF REFERENCE NUMERALS

Figure 1:
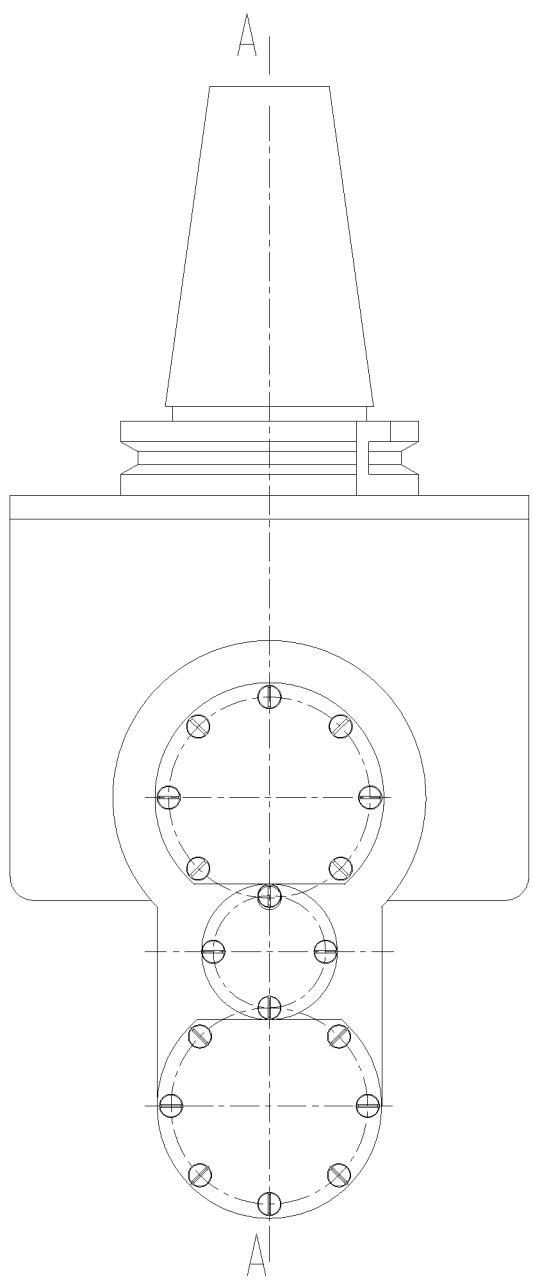
FIG. 1 is a front view of a combined type angle head milling cutter.
Figure 2:
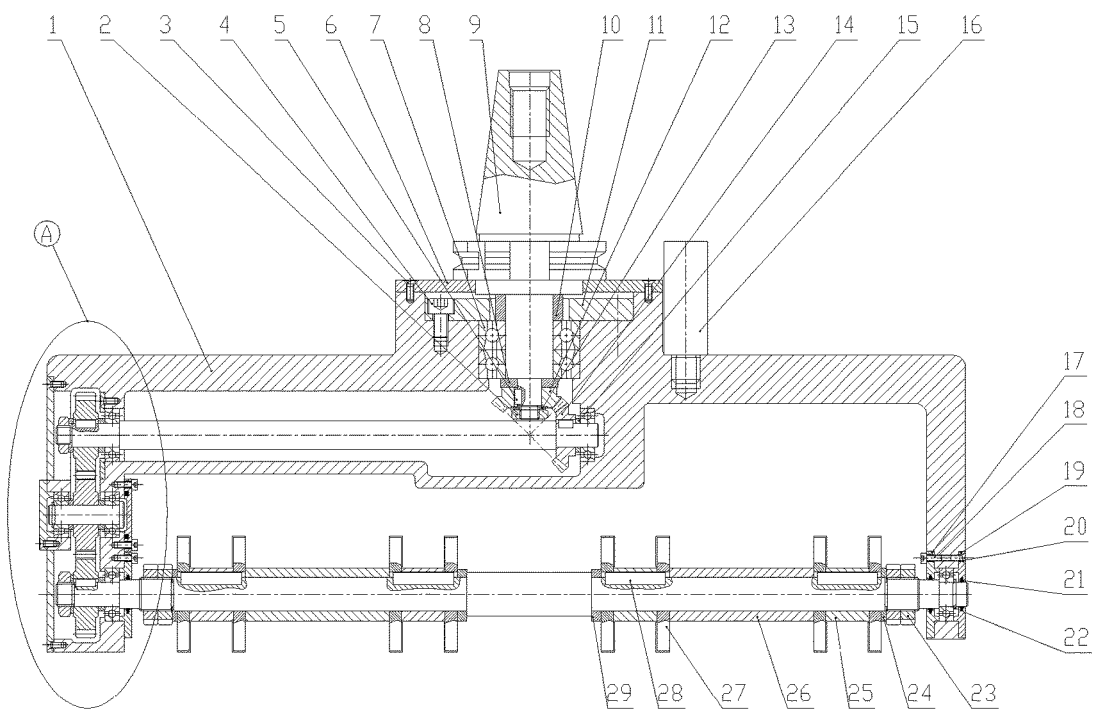
FIG. 2 is an A-A sectional view of a combined type angle head milling cutter.
Figure 3:
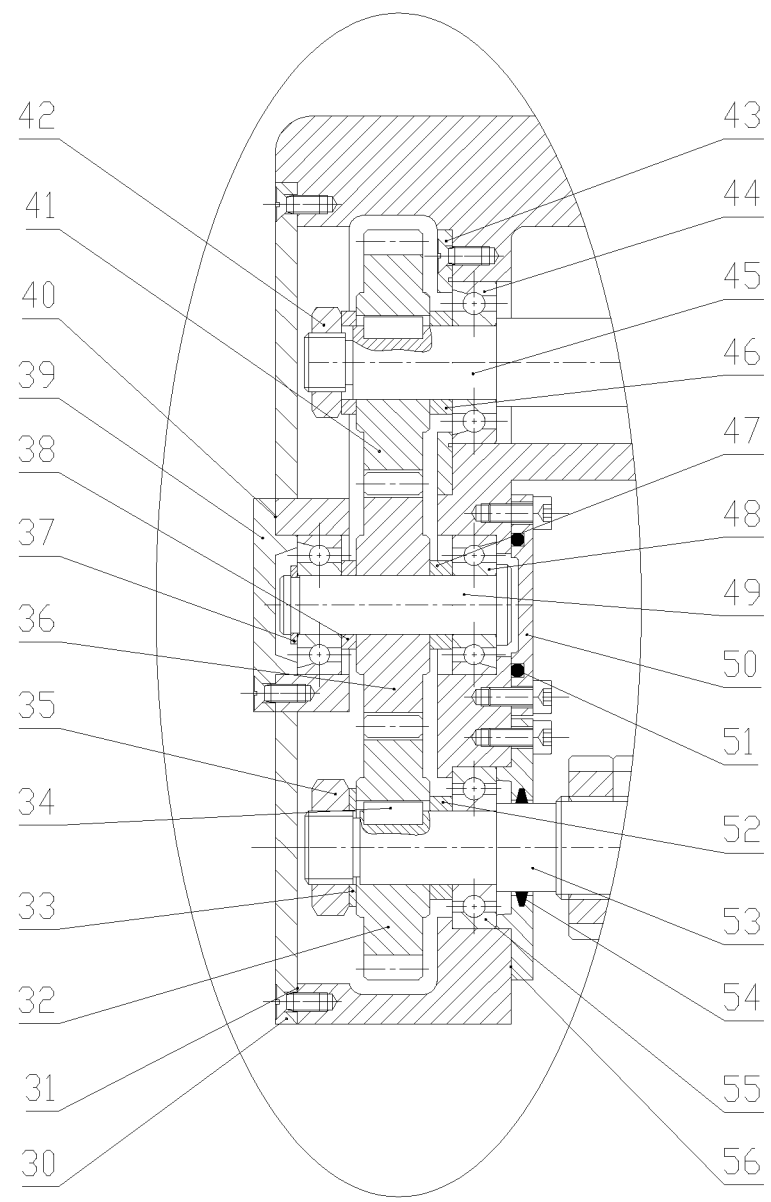
FIG. 3 is an enlarged partial view (2:1) of an A part of a combined type angle head milling cutter.
Figure 4:
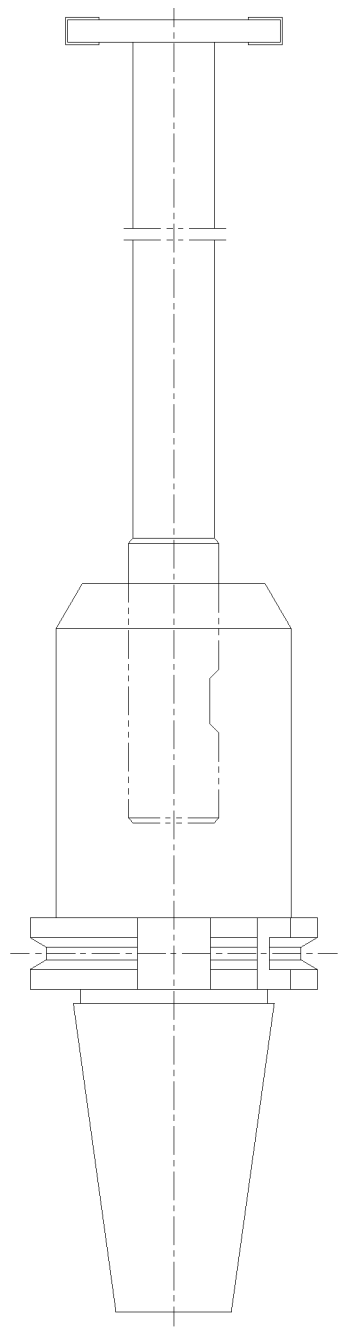
FIG. 4 is a schematic diagram of a milling cutter in the prior art.

1 angle head body
2 lock nut
3 first slotted countersunk head screw
4 first hexagon socket head cap screw
5 first flat key
6 semicircle seal cover
7 first angular contact ball bearing
8 cutter handle shaft lower adjusting pad
9 cutter handle shaft
10 cutter handle shaft upper adjusting pad
11 bearing cover plate
12 first bevel gear
13 first spring washer
14 second bevel gear
15 bevel gear adjusting pad
16 orientation shaft
17 cutter shaft inner-side seal cover
18 second hexagon socket head cap screw
19 cutter shaft outer-side seal cover
20 second slotted countersunk head screw
21 small seal ring
22 first shaft circlip
23 round nut
24 flat washer
25 short cutter locating sleeve
26 long cutter locating sleeve
27 cutter
28 second flat key
29 cutter adjusting pad
30 cutter shaft end cover
31 big rubber seal flat pad
32 cylindrical gear
33 second spring washer
34 third flat key
35 M10 hexagon thin nut
36 cylindrical transition gear
37 second shaft circlip
38 left transition gear adjusting pad
39 transition shaft end cover
40 small rubber seal flat pad
41 cylindrical drive gear
42 M8 hexagon thin nut
43 bearing retaining ring
44 second angular contact ball bearing
45 drive shaft
46 drive gear adjusting pad
47 right transition gear adjusting pad
48 third angular contact ball bearing
49 transition shaft
50 transition shaft seal cover
51 O-shaped rubber seal ring
52 gear adjusting pad
53 cutter shaft
54 big seal ring
55 deep groove ball bearing
56 rubber seal flat pad

DETAILED DESCRIPTION

Embodiment 1

A combined type angle head milling cutter for machining mounting faces of an axial bearing provided by the disclosure is for the OP30 operational sequences of a cylinder head cover. A combined type angle head milling cutter for machining mounting faces of an axial bearing includes an angle head body (1), a lock nut (2), first slotted countersunk head screws (3), a first hexagon socket head cap screw (4), a first flat key (5), semicircle seal covers (6), first angular contact ball bearings (7), a cutter handle shaft lower adjusting pad (8), a cutter handle shaft (9), a cutter handle shaft upper adjusting pad (10), a bearing cover plate (11), a first bevel gear (12), a first spring washer (13), a second bevel gear (14), a bevel gear adjusting pad (15), an orientation shaft (16), cutter shaft inner-side seal covers (17), second hexagon socket head cap screws (18), a cutter shaft outer-side seal cover (19), a second slotted countersunk head screw (20), a small seal ring (21), a first shaft circlip (22), round nuts (23), flat washers (24), short cutter locating sleeves (25), long cutter locating sleeves (26), cutters (27), second flat keys (28), cutter adjusting pads (29), a cutter shaft end cover (30), a big rubber seal flat pad (31), a cylindrical gear (32), a second spring washer (33), a third flat key (34), an M10 hexagon thin nut (35), a cylindrical transition gear (36), a second shaft circlip (37), a left transition gear adjusting pad (38), a transition shaft end cover (39), a small rubber seal flat pad (40), a cylindrical drive gear (41), an M8 hexagon thin nut (42), a bearing retaining ring (43), a second angular contact ball bearing (44), a drive shaft (45), a drive gear adjusting pad (46), a right transition gear adjusting pad (47), a third angular contact ball bearing (48), a transition shaft (49), a transition shaft seal cover (50), an O-shaped rubber seal ring (51), a gear adjusting pad (52), a cutter shaft (53), a big seal ring (54), deep groove ball bearings (55) and a rubber seal flat pad (56); characterized in that eight cutters (27) are installed on the cutter shaft (53), the cutters (27) are set in a way that the positions thereof are adjusted via the cutter adjusting pads (29), the short cutter locating sleeves (25) and the long cutter locating sleeves (26), and the flat washers (24) are placed on the outmost cutters (27) and fixed by the round nuts (23); two ends of the cutter shaft (53) are installed on the angle head body (1) by the deep groove ball bearings (55), and the cutter shaft inner-side seal covers (17) and the rubber seal flat pad (56) are installed on two sides of the interior of the angle head body (1) by the second hexagon socket head cap screws (18); the cutter shaft (53) inner-side seal covers not only are set to position the deep groove ball bearings (55), but also stop cutting fluid and dust from entering the interior of the angle head body via the big seal ring (54); the right side of the cutter shaft (53) is sealed by the cutter shaft outer-side seal cover (19), the rubber seal flat pad (56) and the small seal ring (21), the cylindrical gear (32) is installed on the left side of the cutter shaft (53), the position of the cylindrical gear (32) is adjusted via the gear adjusting pad (52), the second spring washer (33) is installed and fixed by the M10 hexagon thin nut (35), the cutter shaft end cover (30) and the big rubber seal flat pad (31) are installed on the outer side of the angle head body (11), and thus the cutter shaft (53) is sealed; the tail of the cutter handle shaft (9) meets the ISO7:24 standard, and used for being butted with the spindle of a machine tool; the cutter handle shaft (9) is installed on the angle head body (1) via the pair of first angular contact ball bearings (7), and the position of the cutter handle shaft (9) is adjusted via the cutter handle shaft upper adjusting pad (10); the first bevel gear (12) is installed at the end part of the cutter handle shaft, the position of the first bevel gear (12) is adjusted by the cutter handle shaft lower adjusting pad (8), and the first spring washer (13) and the lock nut (2) are used for fixing the first bevel gear (12) for preventing loosening; the outer rings of the first angular contact ball bearings and the angle head body are fixed by the bearing cover plate (11), and the cutter handle shaft is sealed by two semicircle seal covers (6); and the drive shaft (35) is connected to the angle head body (1) via the second angular contact ball bearing (44), and the position of the drive shaft (35) is fixed by a shaft shoulder and the bearing retaining ring (43). The second bevel gear (14) is installed on the right end of the drive shaft, and engaged with the first bevel gear (12) for transferring power, and the position of the second first bevel gear is adjusted by the bevel gear adjusting pad (15). The cylindrical drive gear (41) is installed on the left end of the drive shaft, the position of the gear is adjusted by the drive gear adjusting pad (46), the gear is fixed by the M8 hexagon thin nut (42), and the spring washer is placed therebetween for preventing loosening; the transition shaft (49) is connected to the angle head body (1) via the third angular contact ball bearing (48), the cylindrical transition gear (36) installed on the transition shaft (49) is engaged with the cylindrical gear (32) and the cylindrical drive gear (41), the position of the cylindrical transition gear (36) is adjusted via the right transition gear adjusting pad (47), and the end part of the drive shaft is fixed by the second shaft circlip (37) for preventing the drive shaft from axially moving; the transition shaft end cover (39) and the small rubber seal flat pad (40) are installed on the outer side of the angle head body, the transition shaft seal cover (50) and the O-shaped rubber seal ring (51) are installed on the inner side of the angle head body, and the above four components are all used for sealing the transition shaft and preventing the entering of the cutting fluid. The tail of the cuter handle shaft (9) meets the ISO7:24 standard.

When the combined type angle head milling cutter is in use, blind rivets are installed on the cutter handle shaft (9) to manually install the milling cutter on the spindle of a machine tool, and the orientation shaft (16) is inserted into a stop dog on the end face of the machine tool. After the spindle rotates, the cutter handle shaft (9) is driven to rotate, and the orientation shaft (16) does not rotate with the action of the stop dog, so that the angle head body (1) does not rotate either. Via the pair of first bevel gear (12) and second bevel gear (14), power is transferred to the drive shaft (35) from the cutter handle shaft (9), namely the cutter handle shaft (9) drives the drive shaft (35) to rotate. The cylindrical drive gear (41) installed on the drive shaft (35) transfers power to the cylindrical gear (32) via the cylindrical transition gear (36), namely the drive shaft (35) drives the cutter shaft (53) to rotate. The eight cutters installed on the cutter shaft (53) rotate along with the shaft for machining parts.

The invention claimed is:
1. A combined type angle head milling cutter for machining mounting faces of an axial bearing, comprising an angle head body, a lock nut, first slotted countersunk head screws, a first hexagon socket head cap screw, a first flat key, semicircle seal covers, first angular contact ball bearings, a cutter handle shaft lower adjusting pad, a cutter handle shaft, a cutter handle shaft upper adjusting pad, a bearing cover plate, a first bevel gear, a first spring washer, a second bevel gear, a bevel gear adjusting pad, an orientation shaft, cutter shaft inner-side seal covers, second hexagon socket head cap screws, a cutter shaft outer-side seal cover, a second slotted countersunk head screw, a small seal ring, a first shaft circlip, round nuts, flat washers, short cutter locating sleeves, long cutter locating sleeves, cutters, second flat keys, cutter adjusting pads, a cutter shaft end cover, a big rubber seal flat pad, a cylindrical gear, a second spring washer, a third flat key, an M10 hexagon thin nut, a transition cylindrical gear, a second shaft circlip, a left transition gear adjusting pad, a transition shaft end cover, a small rubber seal flat pad, a cylindrical drive gear, an M8 hexagon thin nut, a bearing retaining ring, a second angular contact ball bearing, a drive shaft, a drive gear adjusting pad, a right transition gear adjusting pad, a third angular contact ball bearing, a transition shaft, a transition shaft seal cover, an O-shaped rubber seal ring, a gear adjusting pad, a cutter shaft, a big seal ring, deep groove ball bearings and a rubber seal flat pad; characterized in that, eight cutters are installed on the cutter shaft, the cutters being set in a way that positions thereof are adjusted via the cutter adjusting pads, the short cutter locating sleeves and the long cutter locating sleeves, and the flat washers being placed on the outmost cutters and fixed by the round nuts; two ends of the cutter shaft being installed on the angle head body by the deep groove ball bearings, and the cutter shaft inner-side seal covers and the rubber seal flat pad being installed on two sides of the interior of the angle head body by the second hexagon socket head cap screws; the cutter shaft inner-side seal covers not only being set to position the deep groove ball bearings, but also stopping cutting fluid and dust from entering the interior of the angle head body via the big seal ring; the right side of the cutter shaft being sealed by the cutter shaft outer-side seal cover, the rubber seal flat pad and the small seal ring, the cylindrical gear being installed on the left side of the cutter shaft, the position of the cylindrical gear being adjusted via the gear adjusting pad, the second spring washer being installed and fixed by the M10 hexagon thin nut, the cutter shaft end cover and the big rubber seal flat pad being installed on the outer side of the angle head body, and thus the cutter shaft being sealed; the cutter handle shaft being butted with the spindle of a machine tool; the cutter handle shaft being installed on the angle head body via the pair of first angular contact ball bearings, and the position of the cutter handle shaft being adjusted via the cutter handle shaft upper adjusting pad; the first bevel gear being installed at the end part of the cutter handle shaft, the position of the first bevel gear being adjusted by the cutter handle shaft lower adjusting pad, and the first spring washer and the lock nut being used for fixing the first bevel gear for preventing loosening; the outer rings of the first angular contact ball bearings and the angle head body being fixed by the bearing cover plate, and the cutter handle shaft being sealed by two semicircle seal covers; the drive shaft being connected to the angle head body via the second angular contact ball bearing, and the position of the drive shaft being fixed by a shaft shoulder and the bearing retaining ring; the second bevel gear being installed on the right end of the drive shaft, and engaged with the first bevel gear for transferring power, and the position of the second bevel gear being adjusted by the bevel gear adjusting pad; the cylindrical drive gear being installed on the left end of the drive shaft, the position of the gear being adjusted by the drive gear adjusting pad, the gear being fixed by the M8 hexagon thin nut, and the spring washer being placed therebetween for preventing loosening; the transition shaft being connected to the angle head body via the third angular contact ball bearing, the transition cylindrical gear installed on the transition shaft being engaged with the cylindrical gear and the cylindrical drive gear, the position of the transition cylindrical gear being adjusted via the right transition gear adjusting pad, and the end part of the drive shaft being fixed by the second shaft circlip for preventing the drive shaft from axially moving; and the transition shaft end cover and the small rubber seal flat pad being installed on the outer side of the angle head body, the transition shaft seal cover and the O-shaped rubber seal ring being installed on the inner side of the angle head body, and the above four components being all used for sealing the transition shaft and preventing the entering of the cutting fluid.

2. The combined type angle head milling cutter for machining the mounting faces of the axial bearing according to claim 1, wherein the cutter handle shaft has a tail which meets the ISO7:24 standard.

\* \* \* \* \*